United States Patent Office 3,736,297
Patented May 29, 1973

3,736,297
ACYLATION OF PYRAZOLE CONTAINING POLYMERS
William J. I. Bracke, Brussels, Belgium, assignor to Labofina S.A., Brussels, Belgium
Filed Jan. 5, 1972, Ser. No. 215,686
Claims priority, application Belgium, Apr. 21, 1971, 766,039
Int. Cl. C08g 22/02
U.S. Cl. 260—77.5 C                              12 Claims

ABSTRACT OF THE DISCLOSURE

Polymer compositions having a molecular weight above 1000 and containing the repeating units, distributed at random:

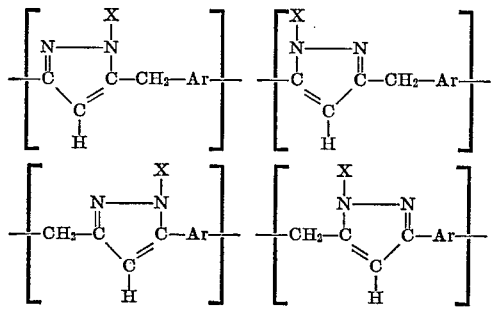

wherein Ar is a divalent radical selected from the group consisting of aliphatic radicals, alicyclic radicals, aliphatic-alicyclic radicals, carbocyclic and heterocyclic aryl radicals and X is the radical of an acid selected from the group consisting of organic and inorganic acids and substituted such acids.

---

The present invention relates to new high-polymers containing pyrazole units, more particularly acylated pyrazole units, and to a process for their manufacture.

In copending application Ser. No. 61,849 filed on Aug. 6, 1970, and now abandoned, there is described polymers having the following units, distributed at random:

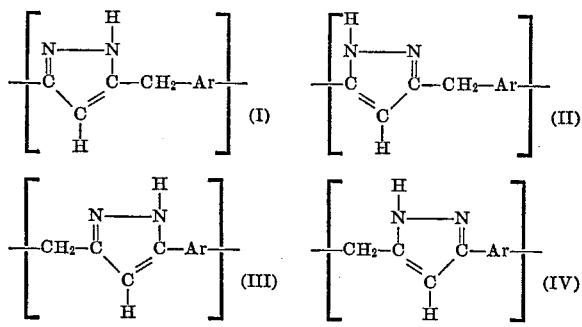

where Ar is a divalent radical which is either an aliphatic, alicyclic, aliphatic-alicyclic radical or a carbocyclic or heterocyclic aryl radical or a substituted such radical. In these polymers, the linking unit is either in the para or meta position to the divalent radical when such radical is aryl. The molecular weight of these polymers generally is higher than 1,000 and more particularly is between 1,000 and 50,000. These polymers are quite stable over a substantial temperature range and they are formable into fibers, films, coatings and shaped bodies. For example, solutions of these polymers can be easily obtained and strong colorless fibers can be spun using conventional techniques, e.g. wet spinning.

For some uses, it has been found desirable to modify the above polymers to enhance some property or properties which are particularly required for a specific end use. In some instances, improvement can be obtained by using known additives, such as dyestuffs, to color fibers, or by using stabilizers to impart self-extinguishing properties, etc. However, the use of such additives require special compounding treatments and the improvements obtained are in many instances, still not sufficient.

It is an object of the present invention to provide new polymers containing pyrazole units having improved and lasting properties. Another object of this invention is to provide means for chemically modifying the heretofore disclosed pyrazole-containing polymers. A further object is to provide for subjecting certain pyrazole unit containing polymers to a surface treatment without degradation or internal modification of these polymers.

According to this invention there are provided polymers containing the following repeating units, distributed at random:

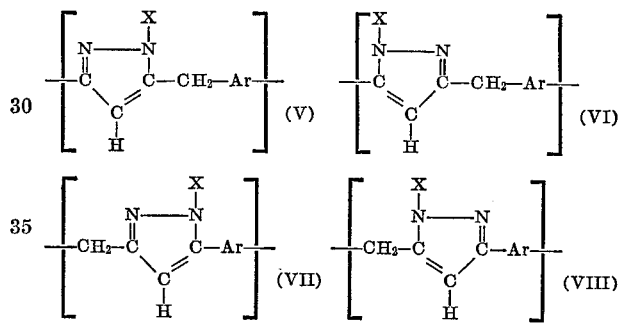

Where Ar is a divalent radical which is either an aliphatic, alicyclic, aliphatic-alicyclic radical or a carbocyclic or heterocyclic aryl radical or substituted such radical, X is a radical of an organic or inorganic oxo-acid, more particularly the radical of a carboxylic acid (acyl radical), of a sulfonic acid (sulfonyl radical), or of a phosphoric acid (phosphonyl radical). In addition, X may also be a radical of acidic compounds such as thiocarboxylic acids, isothiocyanates, mono- or polyisocyanates, cyanuric acid or substituted cyanuric acids, trimer of phosphonitrile chloride, and the like. For a sake of brevity, the above described "X" radicals will be called hereafter "acyl radicals" and the term "acylated polymer" will be used for the polymers containing the above repeating units V to VIII. The above defined polymers have molecular weights above 1000.

In accordance with the present invention, these new polymers are prepared by reacting a pyrazole-containing polymer having the hereinabove given Formulas I to IV with an electron acceptor, hereinafter referred to as "acylating agents." These acylating agents are preferably selected from the more reactive forms, i.e. from the group comprising the anhydrides and chlorides or other halides of carboxylic and sulfonic acids, chlorides of phosphonic acids, chlorides of thiocarboxylic acids, isocyanates, thioisocyanates, chloride of cyanuric acid, trimer or other polymers of phosphonitrilic chloride, and their substituted derivatives.

By reaction with one of these acylating agents, the H atom linked to an N atom of each pyrazole ring of the starting polymer is substituted by the radical of the acylating agent and it has been found that this reaction occurs without degradation of the polymer chain.

In one embodiment of the process of the present invention, the starting polymer is dissolved in a non-reactive solvent, such as dimethylformamide, dimethylsulfoxide, N-methylpyrrolidone, hexamethylphosphortriamide, tetramethylenesulfone or pyridine. The acylating agent, also dissolved in a suitable solvent, is then added and the mixture is stirred at the desired temperature.

The temperature at which the reaction is carried out depends upon the nature of the acylating agent and may be varied within wide limits, ranging from room temperature to as high as the boiling point of the solvent. Higher temperatures can be used if a pressure vessel is employed. The acylated polymer is then recovered by any suitable method, such as precipitation by a lower aliphatic alcohol, such as methanol.

Another embodiment of the present invention, more particularly applied for treating fibers of the starting polymer, comprises conducting these fibers through a solution of the acylating agent. The starting polymer, in the form of fibers or films, can also be acylated by immersion into a solution of the acylating agent. Conditions for either method of treating fibers are substantially the same as those described above in reference to temperature and pressure.

The acylating reaction of the present invention is very flexible and the choice of the most convenient way to carry it out is dependent on the physical state of the starting polymer and on the improvement or modification to be imparted. By this acylating treatment, the starting polymer is chemically modified and it has been found that this reaction occurs without degradation of the polymer chain, thus without adverse effect on other properties of the polymer.

The choice of the acylating agent will be dictated by the desired modification or improvement to be obtained with reference to the starting polymer. In the case of fiber-forming polymers, the properties to be more particularly enhanced are elasticity, coloration and flame-resistance. With regard to elasticity, the acylating agents generally are comprised of the group consisting of carboxylic acid anhydrides and carboxylic acid halides. These compounds are derived from acids having the general formula

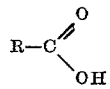

where R is a hydrocarbon radical, which may be a substituted or unsubstituted aliphatic, cycloaliphatic or carbocyclic or heterocyclic aryl hydrocarbon radical. Among these acylating agents, benzoyl chloride, acetyl chloride and acetic anhydride are the most generally used in view of their availability and low cost. But other similar compounds are applicable in the process of this invention and they are useful not only to improve elasticity, but also to impart other valuable properties. This result generally is obtained through the use of a substituted acylating agent, the substituents being selected according to such further desired properties. For example, pyrazole-containing polymers which are acylated by chlorinated benzoyl chloride or by chlorinated fatty acids chlorides are more flame-resistant.

Sulfonyl chlorides are another class of acylating agents useful in the present invention. These compounds have the general formula R—SO$_2$Cl, in which R generally is an aliphatic or an aromatic hydrocarbon radical, which may be further substituted. Moreover, anhydrides of sulfonic acids or sulfones, having the general formula

are other acylating agents which are useful to impart elasticity. These sulfones may also act as coloring agents when R is a dyestuff radical (chromophore radical).

Isocyanates R—N=C=O and isothiocyanates $$R—N=C=S$$

where R is an aliphatic, cycloaliphatic carbocyclic, or heterocyclic aryl radical are other useful acylating agents, the X radical of the acylated polymers being in this case respectively the R—NH—CO and the R—NH—CS— radical.

In order to impart particularly flame-resistant properties to the pyrazole-containing polymers, the acylating treatment of this invention may be carried out with phosphonyl compounds, such as chlorides of phosphonic acids or polymers of phosphonitrilic chlorides, namely the trimer

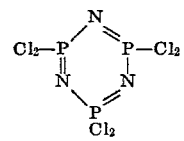

The process of this invention may also be applied to the coloring of fibers made from pyrazole-containing polymers. In this respect, the so-called reactive coloring substances are particularly useful. The molecule of these substances comprises a chromophore part and reactive part, these two parts being linked by a bonding group. With some of these substances, the reactive part is an acylating group, somewhat similar to cyanuric acid chloride. Examples of reactive coloring substances are the chlorotriazines having the formula

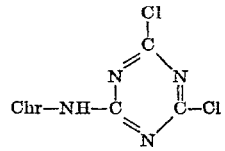

where Chr is the chromophore group and NH is the bonding group. Similar compounds were chlorinated pyrimidine, chlorinated pyridazone, chlorinated quinoxaline, chlorinated quinazoline, chlorinated phthalazine and chlorinated benzthiazole are substituted for chlorotriazine are further illustrative of acylating and coloring agents.

It is clear that products other than fibers prepared from pyrazole-containing polymers can be acylated by the process of this invention. In some instances, this acylating treatment may be directed in order to confer new and valuable properties to the starting polymers, so that the application range of these polymers is extended. Again, the new properties which are so acquired by the acylated polymers depend largely on the nature of the substituent linked to the acylating agent. In this way, ion-exchange resins may be prepared by treating the starting polymer by a compound containing both an acylating group and a sulfonic acid group, i.e. sulfobenzoic acid chloride. On the other hand, the use of acylating agents of compounds containing more than one acylating group gives rise to polymers which may be cross-linked. Among these compounds, the most generally used are the anhydrides of aromatic polycarboxylic acids, as for example pyromellitic anhydride, and the di- or tri-isocyanates, such as 1,6-hexanediisocyanate and 4,4',4"-triphenylmethanetriisocyanate.

The amount of acylating agent is to be employed in carrying out the present invention may be varied, depending on the degree and type of desired modification or improvement. To enhance to a maximum the elasticity or to impart flame stability, the acylating agent should be used in an amount corresponding to at least one mole of this agent per pyrazole group in the starting polymer. An excess of acylating agent is advisable to assure a complete acylation and quantitative yield. But, in some instances, as for example to dye fibers or to prepare cross-linked or cross-linkable polymers, less than the stoichiometric amount of acylating agent generally is used.

In order to improve more than one property of the starting polymer, a mixture of acylating agents may be used to react with the starting polymer. Alternatively, the pyrazole-containing polymer may be reacted with less than the stoichiometric amount of one type of acylating agent for one property and then reacted with another type of acylating agent for another property.

The solubility of the acylated polymers depends on the type of compound which has been used as acylating agent. As a general rule, the polymers which have been treated by a compound containing no reactive group other than the acylating group are soluble in the solvents which dissolve the starting polymers. When the acylating agent comprises a solubilizing group besides the acylating group, the treated polymer is soluble in a wide variety of solvents. But with acylating agents having two acylating groups, the treated polymers are cross-linked and become resistant to solvents. Therefore, it can be seen that the selection of the acylating agent has a great influence on the solubility of the treated polymer. This influence is important with regard to the intended uses of the acylated polymers. The acylating treatment is more particularly directed to the manufacture of elastic, dyed and/or flame-resistant fibers, films and coatings. Cross-linkable or directly cross-linked polymers, ion-exchange resins, shaped bodies and other valuable products.

The following examples are given to illustrate the present invention. In these examples, the viscosity is determined with 0.5 g. of polymer in 1 dl. of dimethylformamide at 30 °C.

EXAMPLE 1

1 g. of pyrazole-containing polymer is dissolved in 10 ml. of pyridine. Separately, a solution is made of 1.35 g. of benzoyl chloride in 12 ml. of pyridine. The two solutions are mixed at room temperature in a flask equipped with a magnetic stirrer. After 15 minutes, the mixture is heated at 80° C. and kept at this temperature for 1 hour. The polymer is then isolated by precipitation in methanol. The yield is 96%.

The starting polymer had an inherent viscosity of 0.7 dl./g. and the resulting N-benzoylpyrazole-containing polymer had an inherent viscosity of 0.32 dl./g.

The analysis of the final product is.—Calculated for $C_{17}H_{12}N_2O$ (percent): C, 78.44; H, 4.65; N, 10.76; O, 6.15. Found (percent): 78.34; H, 4.78; N, 10.74; O, 6.14.

The tensile strength and the modulus of a sample were as follows:

|  | P.s.i. |
|---|---|
| Strength | 9,500 |
| Modulus | 194,000 |

EXAMPLE 2

Example 1 was substantially repeated with the exception that 1.4 g. of cyclohexane carboxylic acid chloride was used instead of the benzoyl chloride.

The acylated polymer was precipitated in methanol. The yield was 94%.

EXAMPLE 3

The operation of Example 1 was substantially repeated with the exception that 1.50 g. of m-acetyl benzoyl chloride was used instead of benzoyl chloride.

The acylated polymer was obtained with a yield of 93% and had a modulus of 150,000 p.s.i.

EXAMPLE 4

The following mixture is heated at 110° C. for 30 minutes: 1 g. of pyrazole-containing polymer, 3 g. of benzenesulphonylchloride and 15 ml. of pyridine. After the reaction, the viscous solution is diluted to contain 5% of solid and the polymer is precipitated in MeOH. The yield is 74%.

The viscosity of the initial polymer is 0.59 dl./g. and the viscosity of the acylated polymer is 0.73 dl./g.

The analysis of the product is. — Calculated for $C_{16}H_{12}N_2O_2S$ (percent): C, 64.85; H, 4.08; N, 9.45; S, 10.82. Found (percent): C, 65.26; H, 4.07; N, 9.00; S, 10.66.

A 0.01 mm. thick film of the acylated polymer gave a strong I.R. absorption, due to the sulphonyl groups, at 1390 and 1190 cm.$^{-1}$.

EXAMPLE 5

By the same method described in Example 1, a pyrazole-containing-polymer is treated by sulphobenzoyl chloride.

The analysis of the resulting polymer product gives.—Calculated for $C_{17}H_{12}N_2O_4S$ (percent): C, 60.00; H, 3.53; N, 8.24; S, 9.41. Found (percent): C, 59.92; H, 3.51; N, 8.27; S, 9.47.

EXAMPLE 6

Example 1 is substantially repeated with the exception that the chloride of thiophenecarboxylic acid is substituted for benzoyl chloride as acylating agent.

The analysis of the acylated polymer gives.—Calculated for $C_{15}H_{10}N_2OS$ (percent): C, 67.67; H, 3.76; N, 10.53; S, 12.03. Found (percent): C, 67.58; H, 3.73; N, 10.62; S, 12.09.

EXAMPLE 7

One gram of a pyrazole-containing polymer, with 20% p- and 80% m-isomers and with an inherent viscosity of 0.47 dl./g. is dissolved in 10 ml. of pyridine. Five ml. of acetic anhydride are then added and the mixture is heated at reflux temperature for one hour. The polymer is isolated by precipitation in methanol. The yield of pure product is 95%.

The inherent viscosity of the acylated polymer is 0.24 dl./g.

The analysis gives.—Calculated for $C_{12}H_{10}N_2O$ (percent): C, 72.71; H, 5.08; N, 14.13. Found (percent): C, 71.57; H, 5.08; N, 13.83.

EXAMPLE 8

An amount of the same starting polymer (0.624 grams) as employed in Example 6 is dissolved in 12.5 ml. of pyridine. One ml. of acetylchloride is then dissolved in 5 ml. of pyridine and this mixture is slowly added to the polymer solution. The reaction mixture is stirred for 3 hours. The acetylated polymer is precipitated with methanol. The yield of acylated polymer is quantitative.

The resulting polymer has the same infra-red spectrum and the same viscosity as those of the polymer prepared following Example 7.

EXAMPLE 9

The operation of Example 7 was substantially repeated with the exception that 5 ml. of a mixture containing equimolar amounts of acetyl chloride and lauroyl chloride was employed as the acylating agents.

The resulting acylated polymer, containing both acetyl and lauryl groups, had an inherent viscosity of 0.25 dl./g.

EXAMPLE 10

One gram of the same polymer as used in Example 7 is dissolved in 10 ml. of pyridine. Five ml. of propane-sulfone are added and the mixture is heated at reflux temperature for 1 hour. The polymer is isolated by precipitation in methanol. The yield of pure product is 93%.

EXAMPLE 11

Fibers of pyrazole-containing polymers are conducted at room temperature through a freshly prepared, slightly alkaline solution of the following reactive coloring agent:

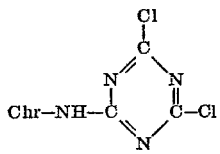

which is a derivative of the chloride of cyanuric acid. The chromophore group Chr is in this case the radical of alizarine (Alizarine-red).

The resulting fibers are red in color.

The same results have been achieved with the use of solutions of the following reactive coloring agents:

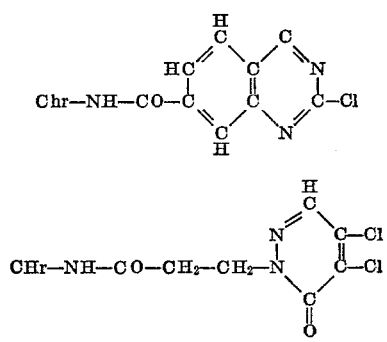

In each case, the dye is chemically bounded to the fibers of the polymer and thus withstands the effect of light and washing.

EXAMPLE 12

Ten grams of sublimed pyromellitic anhydride are dissolved in 200 ml. of carefully dried pyridine (distilled over NaOH). A fiber of pyrazole-containing polymer is immersed in this solution for 1 minute and dried at 100° C.

By this cross-linking treatment, the fiber becomes resistant to the attack of solvents.

EXAMPLE 13

Example 12 was substantially repeated with the exception that pyrazine tetracarboxylic acid dianhydride was employed. The resulting fibers are more resistant to attack of solvents than the original fibers.

EXAMPLE 14

One gram of pyrazole-containing polymer with a viscosity of 0.59 dl./g. is dissolved in 10 ml. of pyridine. Two ml. of phenylisocyanate are added and the mixture is heated at 110° C. for 45 minutes. The polymer product is isolated by precipitation in MeOH. The yield is 89.2%. The viscosity of this polymer is 0.58 dl./g.

The analysis of the polymer product gives.—Calculated for $C_{17}H_{13}N_3O$ (percent): C, 74.17; H, 4.76; N, 15.26. Found (percent): C, 74.27; H, 4.78; N, 14.98.

I.R. analysis reveals a strong absorption at 1730 cm.$^{-1}$.

EXAMPLE 15

One gram of 1,3,5,2,4,6 triazatriphosphonine 2,2,4,4,6,6 hexachloride (or phosphonitrilic chloride trimer) is dissolved in hot benzene. A fiber of 6 deniers, obtained from pyrazole-containing polymer, is passed through this solution and subsequently washed in methanol.

A fabric prepared from the resulting treated fibers has a better hand and a better flame resistance than fabrics prepared from the original untreated fibers.

What is claimed is:

1. Polymer compositions having a molecular weight above 1000 and containing the repeating units, distributed at random:

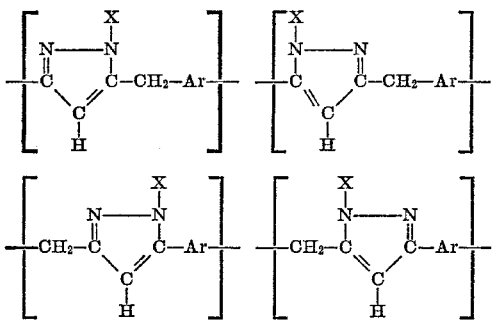

wherein Ar is a divalent radical selected from the group consisting of aliphatic radicals, alicyclic radicals, aliphatic-alicyclic radicals, carbocyclic and heterocyclic aryl radicals and X is the radical of a compound selected from the group consisting of carboxylic acids, thiocarboxylic acids, sulfonic acids, phosphonic acids, mono-isocyanates, polyisocyanates, thiocyanates, cyanuric acid chlorides, the trimer of phosphonitrilic acid chloride and their substituted derivatives.

2. The composition of claim 1 wherein X is

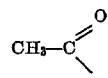

3. The composition of claim 1 wherein X is

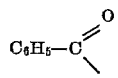

4. The composition of claim 1 wherein X is

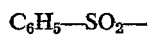

5. The composition of claim 1 wherein X is

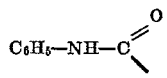

6. The composition of claim 1 wherein X is the radical of the trimer of phosphonitrilic acid chloride.

7. A process for the manufacture of the polymers of claim 1 wherein polymers containing, distributed at random, at least one of the following groups as recurring units.

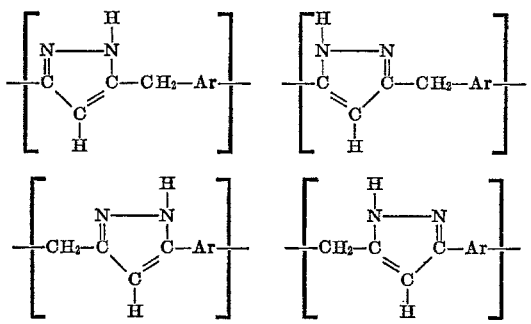

are treated with an acylating compound selected from the group consisting of anhydrides and chlorides of carboxylic and sulfonic acids, chlorides of thiocarboxylic acids, chlorides of phosphonic acids, isocyanates, thiocyanates, chloride of cyanuric acid, trimer of phosphonitrilic chloride and their substituted derivatives.

8. The process of claim 7 wherein said acylating compound is the chloride or anhydride of acetic acid.

9. The process of claim 7 wherein said acylating compound is the chloride of benzenecarboxylic acid.

10. The process of claim 7 wherein said acylating compound is the chloride of benzenesulfonic acid.

11. The process of claim 7 wherein said acylating compound is phenylisocyanate.

12. The process of claim 7 wherein said acylating compound is the trimer of phosphonitrilic acid.

References Cited

UNITED STATES PATENTS 3,519,611   7/1970   Hay _____ 260—94.1

DONALD E. CZAJA, Primary Examiner

M. J. WELSH, Assistant Examiner

U.S. Cl. X.R.

260—77.5 R, 79.3 M, 79.3 R, 94.1, 301, 311